(12) United States Patent
Rätzsch et al.

(10) Patent No.: US 7,368,489 B2
(45) Date of Patent: May 6, 2008

(54) ADDITIVE FOR INHIBITING PHOTOLYTIC DEGRADATION REACTIONS IN AMINOPLASTS

(75) Inventors: Manfred Rätzsch, Wilhering (AT); Daniel Jocham, Linz (AT); Uwe Müller, Luftenberg (AT); Wolfgang Haubold, Merseburg (DE); Arthur Schwesig, Linz (AT); Tatjana Javor, Linz (AT)

(73) Assignee: AMI—Agrolinz Melamine International GmbH, Linz (AT)

( * ) Notice: Subject to any disclaimer, the term of this patent is extended or adjusted under 35 U.S.C. 154(b) by 0 days.

(21) Appl. No.: 10/499,504

(22) PCT Filed: Dec. 19, 2002

(86) PCT No.: PCT/EP02/14644

§ 371 (c)(1),
(2), (4) Date: Jun. 1, 2005

(87) PCT Pub. No.: WO03/054083

PCT Pub. Date: Jul. 3, 2003

(65) Prior Publication Data

US 2005/0234160 A1 Oct. 20, 2005

(30) Foreign Application Priority Data

Dec. 20, 2001 (AT) ............ A 2010/2001
Jul. 22, 2002 (DE) ............ 102 33 848

(51) Int. Cl.
*C08K 5/34* (2006.01)
*C08K 5/3492* (2006.01)
*C09K 15/30* (2006.01)

(52) U.S. Cl. .......... 524/94; 524/100; 524/715; 524/720; 252/401; 252/402; 428/411.1; 428/532

(58) Field of Classification Search ........ 252/401, 252/402; 524/94, 100, 715, 720; 428/411.1, 428/532
See application file for complete search history.

(56) References Cited

U.S. PATENT DOCUMENTS

| 4,937,349 A | * | 6/1990 | Burdeska et al. ........ 548/260 |
| 5,436,345 A | | 7/1995 | Lewis et al. |
| 5,461,151 A | * | 10/1995 | Waterman ............ 544/216 |
| 5,496,875 A | * | 3/1996 | Borzatta et al. ........ 524/99 |
| 5,629,426 A | | 5/1997 | Pastor et al. |
| 6,080,864 A | | 6/2000 | Cunkle et al. |
| 2006/0183821 A1 | * | 8/2006 | Kaspers et al. ........ 524/13 |

FOREIGN PATENT DOCUMENTS

| EP | 0 112 120 A2 | 6/1984 |
| EP | 0 483 488 A1 | 5/1992 |
| EP | 0 581 737 B1 | 2/1994 |
| EP | 0 659 877 A2 | 6/1995 |
| EP | 0 704 560 A1 | 4/1996 |
| JP | 2000-327658 | 11/2000 |
| WO | WO 9932534 | * 7/1999 |
| WO | WO 99/57189 | * 11/1999 |

* cited by examiner

*Primary Examiner*—Kriellion A Sanders
(74) *Attorney, Agent, or Firm*—The Webb Law Firm

(57) ABSTRACT

The invention relates to a UV additive for aminoplast resins, to a method for producing a UV additive as well as to uses thereof. Said UV additive contains soluble sterically-hindered nitroxyl compounds in an aqueous aminoplast precondensate. A UV additive for aminoplast resins with several application forms is thus obtained.

28 Claims, 1 Drawing Sheet

ADDITIVE FOR INHIBITING PHOTOLYTIC DEGRADATION REACTIONS IN AMINOPLASTS

BACKGROUND OF THE INVENTION

1. Field of the Invention

The invention relates to UV additives for amino resins with a nitroxyl compound soluble in an aqueous aminoplastic precondensate, to a UV-resistant amino resin, to a UV-resistant aminoplastic molding composition, to a UV-resistant aminoplastic precondensate, to a process for producing a UV-resistant laminate, to a process for preparing UV-resistant amino resins, and for preparing UV-resistant aminoplastic molding compositions.

2. Description of the Related Art

The excellent properties of thermosets, especially amino resins, gives them outstanding suitability for many applications where demands are, inter alia, scratch resistance, flame retardency, mechanical stability, gloss, environmental compatibility and chemical inertness. From these applications, resistance to UV radiation over many years is also needed, since yellowing or yellow coloration of the surfaces is undesirable. Amino resins therefore require addition of suitable UV stabilisers. Very high requirements are placed upon these UV stabilisers suitable for amino resins. They include, for example, good solubility in the amino resin, since a precondition for their effectiveness is homogeneous distribution of the UV stabilisers in the resin matrix. Another criterion is chemical stability during the curing process characteristic of aminoplastics. Another decisive factor in that there has to be lasting binding of the UV stabiliser within the aminoplastics. This means that there must, for example, be no subsequent leaching of the stabiliser out of the aminoplastics. Another decision factor is that UV protection is active immediately, i.e. as soon as mixing with the aminoplastics has ended. A further decisive factor is that the UV stabilisers do not color aminoplastics but ensure that transparency continues over the years.

U.S. Pat. No. 5,629,426 prepares sterically hindered nitroxyl compounds of 4-hydroxy-2,2,6,6-tetramethylpiperidine type from the underlying 4-hydroxy-2,2,6,6-tetramethylpiperidine, which is not a free radical, via an oxidation process with the aid of hydrogen peroxide in the presence of a carbonate or bicarbonate of ammonium or of an alkali metal as catalyst. One possible use of these nitroxyl compounds is the use as polymerisation inhibitor to prevent premature polymerisation of vinyl monomers.

U.S. Pat. No. 5,436,345 describes another preparation method. An application sector given is the polymerisation of reactive acrylic monomers.

EP 0581737 B1 again describes the use of sterically hindered nitroxyl components of 2,2,6,6-tetramethylpiperidine type. They are described as polymerisation inhibitors in the monomer preparation process for aromatic vinyl components (examples being styrene, alpha-methylstyrene, or in other substituted vinylbenzenes).

Compounds of the type represented by ortho-hydroxyphenylbenzotriazoles, 2-aryl-2H-benzotriazoles, hydroxyaryl-1,3,5-triazines or sulfonated 1,3,5-triazines are also known and are used in textile materials as absorbers for the UV-A and UV-B components of sunlight, these being injurious to the skin. According to EP 0659877 A2, the sun-protection factor of clothing can be increased by adding these compounds to the rinsing water for a textile material, for example. The UV absorbers are in aqueous solution, or if water-solubility is poor, in disperse form when incorporated into the textile material.

There are no UV additives known hitherto which fulfil the requirements for amino resins. The properties of the additives known for thermoplastics are inadequate for aminoplastics. EP 0704560 B1, for example, describes a synergistic combination of UV absorbers from the ortho-hydroxyphenylbenzotriazoles group with a sterically hindered amine (HALS, hindered amine light stabiliser) from the 2,2,6,6-tetramethylpiperidine compounds group, for UV protection of thermoplastic fibres. These UV stabilisers cannot be used for aminoplastics, since they cannot be incorporated homogeneously into aminoplastics.

Furthermore, they have the disadvantage that the substance responsible for the UV protection has to be formed in situ, not until exposure to UV light has begun. This means that there is a time delay in the protective action with respect to UV irradiation.

The object of the present invention was to provide a UV additive for amino resins.

DETAILED DESCRIPTION OF THE INVENTION

For the purposes of the present invention, amino resins are resins which contain, as amine component, melamine, urea, dicyandiamide, cyanamide, guanamine, sulfonamide, aniline, or substituted melamines and urea or mixtures of these components. Preferred amino resins are melamine resins, urea resins or melamine-urea resins.

As carbonyl compound, the amino resins preferably contain aldehydes of chain length C1-C10 or mixtures of this chain length derived from various aldehydes, examples being formaldehyde, acetaldehyde, trimethylolacetaldehyde, acrolein, benzaldehyde, furfural, glyoxal, glutaraldehyde, phthalaldehyde, terephthalaldehyde, isobutyraldehyde, acetone, or ketones, for example methyl ethyl ketone and diethyl ketone. It is particularly preferable to use formaldehyde. Amino resins may also have been etherified, for example with methanol, and the amino resins here have preferably been partially etherified. They may, where appropriate, also comprise modifiers, such as plasticisers.

Amino resins are further processed in the form of aqueous solutions, known as aqueous aminoplastic precondensates. The aqueous aminoplastic precondensates usually comprise additives, such as hardeners, wetting agents, or release agents.

The sterically hindered nitroxyl compound of the invention is soluble in an aqueous aminoplastic precondensate. It belongs to the hindered amine light stabiliser (HALS) group and is in particular a 2,2,6,6-tetramethylpiperidine-N-oxyl compound having a functional group.

It is particularly preferable to use 4-hydroxy-2,2,6,6-tetramethylpiperidinyloxy as nitroxyl compound.

Examples of HALS compounds are piperidine compounds and N-oxyl derivatives of piperidine compounds.

Examples of UV absorbers are 2-hydroxybenzophenone derivatives, hydroxyphenylbenzotriazole derivatives, hydroxyphenyl-s-triazine derivatives, cinnamic acid derivatives and/or oxalanilides. Preference is given to 4-hydroxytetramethylpiperidine and/or 4-amino tetramethylpiperidine, particular preference is given to bis(2,2,6,6-tetramethyl-1-(octyloxy)-4-piperidinyl sebacate and/or etherified piperidine compounds, and also N,N'-diformyl-N,N'-di(1-oxylradical-2,2,6,6-tetramethyl-4-piperidinyl)-1,6-hexanediamine, 4-amino-2-hydroxybenzophenone, 2-hydroxy-4-sulfobenzophenone and/or 2,4-dihydroxybenzophenone, 2-(2,4-dihydroxyphenyl)-2-H-benzotriazole and/or 2-(2-hydroxy-4-sulfo)-2-H-benzotriazole, particularly preferably (α-[3-[-(2H-benzotriazol-2-yl)-5-(1,1,-dimethylethyl)-4-hydroxyphenyl-1-oxopropyl]-ω-hydroxypoly(oxo-1,2-ethanediyl) and/or sodium 3-(2H-benzotriazol-2-yl)-5-sec-butyl-4-hydroxy-benzenesulfonate, 2-(2-hydroxyphenyl)-4,6-(4-sulfophenyl)-1,3,5-triazine and/or 4,6-(4-aminophenyl)-2-(2-hydroxyphenyl)-1,3,5-triazine, 3-(4-hydroxyphenyl) propenecarboxylic acid and/or 3-(4-hydroxyphenyl)-2-methylpropenecarboxylic acid, N,N'-(2-hydroxyphenyl) ethanediamide and/or N-(2-hydroxyphenyl)-N'-(4-sulfophenyl)ethanediamide.

UV absorbers may be used together with the substance of the invention, for example. One possible quantitative proportion of the substance of the invention to UV absorber is from 5:1 to 1:5. A preferred range is from 1:1 to 1:5.

Within the nitroxyl compound, the functional group is preferably in the para position with respect to the N-oxyl group. Examples of functional groups are hydroxy groups or amino groups, ammonium salts, ethylene oxide groups or propylene oxide groups, ethylene oxide-propylene oxide copolymers or carboxylates. Possible cations here are sodium, calcium or magnesium, and chlorides are an example of possible anions.

In addition to the nitroxyl compound, a HALS compound which is not a free radical may be present in the UV additive of the invention. This HALS compound which is not a free radical preferably derives from the same group of substances as the nitroxyl compound, the difference being that the oxy radical has been replaced by a functional group, such as an H group, ether, acyl group, alkyl group, or a hydroxy group.

However, it is also possible to use any desired hydrophobic HALS compounds which are not free radicals, for example in the form of aqueous dispersions, as long as they comply with the requirements for amino resins with regard to acid/base properties and can be incorporated into the amino resin with the desired homogeneity.

Besides the nitroxyl compound of the invention, there is a substituted 1,3,5-triazine or a UV absorber from the ortho-hydroxyphenylbenzotriazoles group soluble in an aqueous aminoplastic precondensate present in the UV additive of the invention. From the triazines group mention may particularly be made here of hydroxyaryl-1,3,5-triazine. Substituted here means generally the presence of an additional chemical group (e.g. functional group, organic moiety). This definition includes hydrogen as substituent.

The UV absorber preferably derives from the ortho-hydroxyphenylbenzotriazoles group. The ortho-hydroxyphenylbenzotriazole advantageously contains a functional group and an organic moiety. The functional group here is preferably in the para position with respect to the OH group, and the organic moiety is preferably in the ortho position with respect to the OH group.

Advantageous embodiments of organic moieties are alkyl moieties of length $C_1$-$C_{12}$ or aryl moieties. Preference is given to alkyl moieties of chain length $C_1$-$C_5$, and particular preference is given to $C_4$-alkyl moieties, such as secondary butyl moieties. Examples of functional groups are ethylene glycol groups, polyethylene glycol groups or polyvinyl alcohol groups or ethylene oxide, propylene oxide, ethylene oxide-propylene oxide copolymers or carboxylates.

Advantageous embodiments of functional groups are salts, the preferred salts being sulfates, sulfonates or ammonium salts. Examples of a possible cation are sodium ions, calcium ions or magnesium ions, and chlorides are examples of possible anions.

In one particularly advantageous embodiment, the UV absorber has an $SO_3^-$ group on an ortho-hydroxyphenylbenzotriazole. A particularly preferred UV absorber is sodium 3-(2H-benzotriazole-2-yl)-5-sec-butyl-4-hydroxybenzenesulfonate.

If the UV absorber derives from the substituted 1,3,5-triazines group, it preferably contains an organic moiety, which is preferably in the meta position with respect to the functional group.

If the UV absorber derives from the hydroxyaryl-1,3,5-triazines group, it preferably contains a functional group and/or one or more organic moieties. The functional group here is preferably in the meta position with respect to the OH group and the organic moiety/moieties on the triazine ring.

Examples of functional groups and organic moieties for the substituted 1,3,5-triazines group are the same as those for the UV absorbers from the ortho-hydroxyphenylbenzotriazoles group.

The amount of UV absorber is advantageously higher than the amount of nitroxyl compound. The amount of UV absorber is from about 1 to 5% by weight, preferably from 1 to 3% by weight, particularly preferably from 1 to 2% by weight, based on the solid amino resin.

The amount of nitroxyl compound of the invention in the UV additive is from about 0.1 to 3% by weight, preferably from about 0.1 to 2% by weight, particularly preferably from about 0.1 to 1% by weight, based on the solid amino resin.

In one preferred embodiment, the UV additive is added during the synthesis of an amino resin. This is a UV-resistant liquid amino resin which is then spray-dried. This gives a UV-resistant solid amino resin.

This solid resin may then be transported and/or stored. It is not dissolved in water until shortly prior to laminate production, and can be used for impregnating a sheet.

In another advantageous embodiment, the UV additive is added to an aminoplastic melt during the synthesis of an aminoplastic molding composition. This gives a UV-resistant aminoplastic molding composition or a UV-resistant pelletized material.

The nitroxyl compound of the invention is used to produce UV-resistant laminates from amino resins, for example.

For the production of the laminates, the UV additive is mixed with an aqueous aminoplastic precondensate whose strength is from about 30 to 70%, preferably from about 50 to 60%, based on the amount of the solid amino resin, giving an aqueous, UV-resistant aminoplastic precondensate.

Where appropriate, additives are added, examples being wetting agents or release agents and plasticisers and also hardeners.

A dry absorbent sheet is then impregnated with this aqueous, UV-resistant aminoplastic precondensate.

For the purposes of the invention, the absorbent sheet preferably comprises cellulose and/or lignocellulose, and takes the form of paper, paperboard, fabric or nonwoven, wood veneers, wood-fibre boards or wood-chip boards.

The resultant sheet impregnated with the aqueous, UV-resistant aminoplastic precondensate is dried prior to further processing. It is possible here for the dried sheet to be saturated again with the aqueous, UV-resistant aminoplastic precondensate and then dried again. A decisive factor is that drying has to take place prior to the further processing of the impregnated sheet. The amount of aminoplastic precondensate applied, based on the sheet initially used, is from about 40 to 200% by weight, preferably from about 100 to 170% by weight, preferably from about 120 to 140% by weight.

One or more of these impregnated and dried sheets are then press-molded, for example, to give a multilayer laminate, and thus fully cured.

It is also possible for the press-molding to be carried out using one or more intermediate layers, such as core papers, or one or more carrier materials, such as press chipboards.

The resultant UV-resistant laminate has outstanding UV resistance and may be used either for outdoor or indoor applications, for example for furniture surfaces, floorcoverings, or facades.

In another advantageous embodiment, the UV additive is added to an aminoplastic melt during the synthesis of an aminoplastic molding composition. This gives a UV-resistant aminoplastic molding composition or a UV-resistant pelletized material.

An advantage of the UV additive of the invention is that it can be incorporated homogeneously into the aqueous aminoplastic precondensate, thus reliably providing uniform distribution, also in the finished laminate. Another advantage is stability during the characteristic curing process for aminoplastics under acidic conditions and at an elevated temperature. In addition, covalent bonds are formed between the UV absorber or the nitroxyl compound of the UV additive and the aminoplastics, resulting in immobilisation of the UV additive in the aminoplastic, and thus preventing subsequent leaching, for example in outdoor applications, even in the long term.

All of these properties of the UV additive of the invention ensure long lasting and uniform UV protection of the aminoplastics.

Another advantage of the UV additive of the invention is immediate protection with respect to exposure to UV radiation, since the active substance responsible for the protective action, in the form of the free-radical nitroxyl compound, is directly present in its active form. In contrast to this, UV-protective action using the known HALS compounds which are not free radicals, which form the active free-radical substance in situ only after exposure to UV radiation has begun, involves a time delay because the in-situ reaction requires a certain time.

Unexpectedly, the sheet impregnated with the UV additive of the invention and dried still has the acquired colorless and transparent surface, as has the laminate produced therefrom.

For laminates it is important that these can be obtained with the specific desired coloring, this usually being the color of the uppermost ply of the sheet. This means that the laminate surface has to be colorless and transparent, and that therefore the UV additive must not cause any coloring of the laminate surface.

Unexpectedly, this requirement is complied with when using the UV additive of the invention, although the nitroxyl compound present in the UV additive has a strong color.

The preferred nitroxyl compound 4-hydroxy-2,2,6,6-tetramethylpiperidinyloxy has a deep orange color, for example. The UV additive of the invention comprising the nitroxyl compound also has this intense color.

Unexpectedly, the sheet retains its original color both during the impregnation with the colored UV additive and during subsequent processing, and the UV-resistant laminate obtained after press-molding and curing therefore has the required colorless and transparent surface.

BRIEF DESCRIPTION OF THE DRAWINGS

Some embodiments of the invention are described below by way of example.

Figure 1:
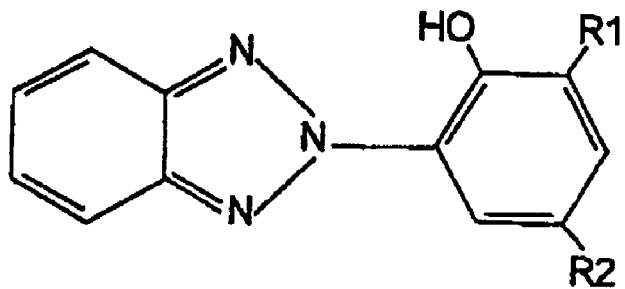
FIG. 1 shows the structural formula of the ortho-hydroxyphenylbenzotriazole with substituents.

Compounds according to FIG. 1 are ortho-hydroxyphenylbenzotriazole compounds according to the teaching of the invention.

Figure 2:
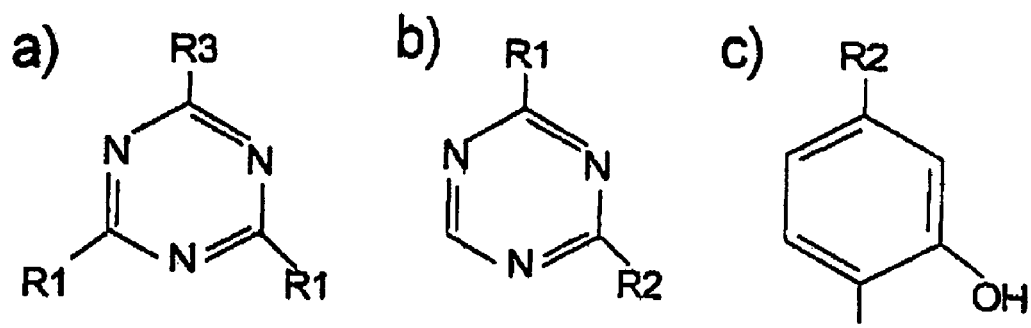
FIGS. 2*a-c* show structural formulae of the triazines with a moiety (FIG. 2*c*)

R1 here may be:
alkyl moieties of $C_1$-$C_{12}$
aryl moieties
R2 may be:
$SO_3^-$ (in the form of Na salt, Ca salt or magnesium salt)
sulfonate
sulfate
$CH_2COO$ (carboxylate)
$CH_2NH_3^+Cl^-$ (ammonium)
$(CH_2—CH_2—O—)_xH$ (ethylene oxide)
propylene oxide
$CH_2—(O—CH_2—CH_2)_x—OH$ ((poly)ethylene glycol)
ethylene oxide-propylene oxide copolymers
$CH_2—(CH_2—CHOH—)_x—OH$ polyvinyl alcohols
$CH_2—COO^-Na^+$ The compounds shown in FIG. 2*a-c* belong to the 1,3,5-triazines class. The possible substituents for R1 and R2 have been described above in the context of FIG. 1. R3 is one of the following moieties.

Hydroxyphenyl having R1 substituents, the moiety R1 having been described above in the context of FIG. 1.

Figure 3:
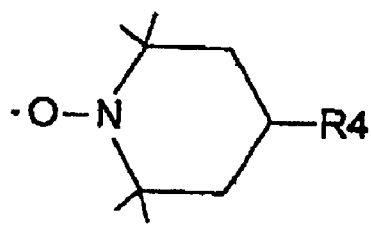
FIG. 3 shows the structural formula of the free-radical nitroxyl compound.

FIG. 3 shows free-radical nitroxyl compounds of hindered amine light stabilizer type, HALS.

R4 here is one of the following moieties:
$NH_2$ (amino)
$NH_3^+Cl^-$ (ammonium)
$(CH_2—CH_2—O—)_xH$ (ethylene oxide)
propylene oxide
ethylene oxide-propylene oxide copolymers
$CH_2COO^-$ (in the form of Na salt, Ca salt or Mg salt) (carboxylate)
OH (hydroxy)

Figure 4:
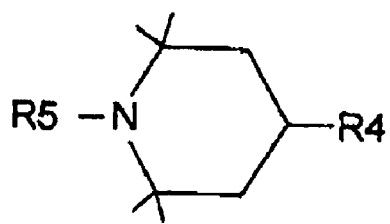
FIG. 4 shows the structural formula of the HALS compound which is not a free radical.

FIG. 4 shows HALS compounds which are not free radicals.

R5 here is one of the following moieties, and R within these moieties is a carbon chain of length $C_1$-$C_{12}$:
H (hydrogen)
OR (ether)
COR (acyl)
R (alkyl)
OH (hydroxy)

Two preparative examples are given below.

EXAMPLE 1

500 g of melamine-formaldehyde resin are dissolved in 500 g of water, and then 3 g of the wetting agent Melpan Nu 117 and 6 g of the hardener Melpan A 462 are added. The nitroxyl compound 4-hydroxy-2,2,6,6-tetramethylpiperidinyloxy and the UV absorber sodium 3-(2H-benzotriazol-2-yl)-5-sec-butyl-4-hydroxybenzenesulfonate are added to this aqueous aminoplastic precondensate. The resultant yellow-orange-colored mixture is stirred until a clear yellow-orange colored solution is obtained.

White decorative-grade paper (density 80 g/m²) is impregnated with this solution. The impregnated decorative-grade paper which, surprisingly, has its initial color after impregnation, is then dried for 20 seconds at 140° C. The dried paper is impregnated a second time with the yellow-orange colored solution comprising the nitroxyl compound and comprising the UV absorber, and then again dried at 140° C. to a residual moisture level of from about 6 to 7% by weight. This double impregnation gives a total resin application of 150% by weight, based on the weight of the dry white decorative-grade paper initially used. The resultant impregnated paper has the same color as the unimpregnated paper initially used. This means that the cured aminoplastic precondensate comprising UV stabilisers complies with the requirement for colorless transparency.

The resultant impregnated decorative-grade paper is press-molded with four plies of a core paper impregnated with melamine-formaldehyde resin without UV stabiliser, and with a balancing paper likewise impregnated with melamine-formaldehyde resin without UV stabiliser, to give a multilayer laminate. The press-molding conditions used here are as follows: press-molding time 2 min, press-molding temperature 150° C., press-molding pressure 80 kg/cm². After subsequent cooling to 70° C., the laminate is removed from the press.

The resultant laminate has a colorless and transparent surface.

The UV resistance of this resultant UV-resistant laminate is measured and compared with a laminate without UV stabiliser. The laminate without UV stabiliser was produced in the same way as the UV-resistant laminate except that the papers used were impregnated with melamine-formaldehyde resin without UV stabiliser.

For measuring UV resistance, the change in the infrared spectrum of the laminate brought about by exposure of the amino resin to UV light was used as a measure of UV resistance. The change in the spectrum here becomes greater as the UV resistance of the particular laminate becomes poorer. An IR spectrum is recorded for both laminates. A dry-weathering test is then carried out, simulating 336 hours of exposure of both laminates to UV light, and the IR spectrum of both laminates is then recorded again and the change in each spectrum is evaluated.

The change in the IR spectrum of the UV-resistant laminate was 0.08 absorption units, whereas that for the laminate without UV stabiliser was 0.23 absorption units.

EXAMPLE 2

A method similar to that of Example 1 was used to impregnate brown decorative-grade paper with the same yellow-orange solution comprising the nitroxyl compound and the UV absorber. The paper was then dried for 1 hour in air and then for 90 seconds at 120° C. in a drying cabinet, until the residual moisture level was about 8% by weight. This single impregnation gave a total resin application of 140% by weight, based on the weight of the dry brown decorative-grade paper initially used.

Using a method similar to that of Example 1, a multilayer laminate was produced from this impregnated paper, four core papers and a balancing paper, and had a transparent surface.

After the IR spectra had been recorded, this UV-resistant laminate was subjected, together with a brown-decorative-paper laminate without UV stabiliser, to a wet-weathering test stimulating 1500 hours of exposure to UV light. An IR spectrum was again recorded for both laminates.

The change in the IR spectrum of the UV-resistant laminate was 0.04 absorption units, whereas that of the laminate without UV stabiliser was 0.18 absorption units.

In the optical test local color-lightening was found for the laminate without UV stabiliser, and moreover, marked loss of gloss and yellowing were discernible. In contrast to this, no change could be determined visually for the UV-resistant laminate.

The invention claimed is:

1. A UV additive for amino resins comprising
   a water soluble, sterically hindered nitroxyl compound soluble in an aqueous aminoplastic precondensate and
   a UV absorber soluble in an aqueous aminoplastic precondensate, wherein the UV absorber comprises ortho-hydroxyphenylbenzotriazoles according to formula I

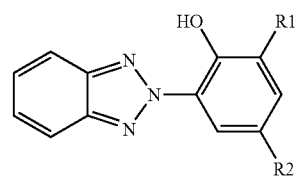

(Formula I)

wherein
   R1: is alkyl moieties of length $C_1$-$C_{12}$, or aryl moieties,
   R2: is $SO_3^-$ (in the form of Na salt, Ca salt or magnesium salt), sulfonate, sulfate, $CH_2COO^-$(carboxylate), $CH_2$—$NH_3^+Cl^-$ (ammonium), $(CH_2$—$CH_2$—$O$—$)_xH$ (ethylene oxide), propylene oxide, $CH_2$—$(O$—$CH_2$—$CH_2$—$)_x$—$OH$ ((poly)ethylene glycol), ethylene oxide-propylene oxide copolymers, $CH_2$—$(CH_2$—$CHOH$—$)_x$—$OH$ polyvinyl alcohols, or $CH_2$—$COO^-Na^+$.

2. The UV additive as claimed in claim 1, wherein the nitroxyl compound is a 2,2,6,6-tetramethylpiperidine N-oxyl compound.

3. The UV additive as claimed in claim 1, wherein the nitroxyl compound is 4-hydroxy-2,2,6,6-tetramethylpiperidinyloxy.

4. The UV additive as claimed in claim 1, wherein the nitroxyl compound comprises ammonium salts, carboxylates, hydroxy groups, amino groups, ethylene oxide groups, propylene oxide groups, or ethylene oxide-propylene oxide copolymers.

5. The UV additive as claimed in claim 1, further comprising an additional sterically hindered amine which is not a free radical.

6. The UV additive as claimed in claim 5, wherein the sterically hindered amine which is not a free radical contains, as a substituent, an ether group, acyl group, alkyl group, hydroxy group, or hydrogen.

7. The UV additive as claimed in claim 1, wherein a substituent for a substance from the ortho-hydroxyphenylbenzotriazoles group is at least one of a functional group which has been arranged in para position with respect to the OH group and an organic moiety which has been arranged in ortho position with respect to the OH group.

8. The UV additive as claimed in claim 1, wherein the UV absorber contains, as a functional group, at least one carboxylate, ethylene glycol, polyethylene glycol group, polyvinyl alcohol group, ethylene oxide group or propylene oxide group, or contains, as organic moieties, at least one aryl moiety or alkyl moiety of length $C_1$-$C_{12}$, in particular one of chain length $C_1$-$C_5$, preferably alkyl moieties of length $C_4$ or contains both.

9. The UV additive as claimed in claim 1, wherein the UV absorber is present in salt form, in particular as sulfate, sulfonate or ammonium salt.

10. The UV additive as claimed in claim 1, wherein the UV absorber comprises ethylene oxide-propylene oxide copolymers.

11. The UV additive as claimed in claim 1, wherein the UV absorber contains a $SO_3$ group on an ortho-hydroxyphenylbenzotriazole.

12. The UV additive as claimed in claim 1, wherein the UV absorber is sodium 3-(2H-benzotriazol-2-yl)-5-sec-butyl-4-hydroxybenzenesulfonate.

13. The UV additive as claimed in claim 1, wherein the UV absorber derives from a group of the ortho-hydroxyphenylbenzotriazoles, in particular having at least one substituent.

14. The UV additive as claimed in claim 13, wherein a functional group is in para position with respect to the OH group and the organic moiety is in the ortho position with respect to the OH group.

15. The UV additive as claimed in claim 1, wherein the amino resins are melamine resins, urea resins, or melamine-urea resins.

16. The UV additive as claimed in claim 1, wherein the proportion of the UV absorber is higher than the proportion of the nitroxyl compound, where the proportion of UV absorber is from about 1 to 5% by weight, in particular from 1 to 3% by weight, preferably from 1 to 2% by weight, based in each case on the solid amino resin.

17. The UV additive as claimed in claim 1, wherein the amount of nitroxyl compound is from about 0.1 to 3% by weight, in particular from 0.1 to 2% by weight, preferably from 0.1 to 1% by weight, based in each case on the solid amino resin.

18. A UV-resistant amino resin comprising a UV additive as claimed in claim 1.

19. A UV-resistant aminoplastic molding composition or UV-resistant pelletized material or both comprising a UV additive as claimed in claim 1.

20. A UV-resistant aminoplastic precondensate comprising a UV additive as claimed in claim 1.

21. The UV-resistant aminoplastic precondensate as claimed in claim 20, comprising from about 30 to 70% by weight, in particular from 50 to 60% by weight, based on the amount of the solid amino resin, of the UV additive of the invention.

22. An absorbent sheet saturated with a UV-resistant aminoplastic precondensate as claimed in claim 20 and dried.

23. The sheet as claimed in claim 22, wherein the absorbent sheet preferably comprises cellulose or lignocellulose or both.

24. A UV-resistant laminate which comprises at least one fully cured sheet as claimed in claim 22.

25. A process for producing a UV-resistant laminate as claimed in claim 24, wherein at least one sheet is saturated with an aminoplastic precondensate which with UV additive is dried, where appropriate, with at least one intermediate layer and, where appropriate, with at least one carrier material, is press-molded and fully cured.

26. The process as claimed in claim 25, wherein the amount of aminoplastic precondensate applied, based on the sheet initially used, is from about 40 to 200% by weight, in particular from 100 to 170% by weight, preferably from 120 to 140% by weight.

27. A process for preparing a UV-resistant amino resin, comprising the step of adding a UV additive as claimed in claim 1 during the synthesis of the amino resin.

28. A process for preparing a UV-resistant aminoplastic molding composition or for preparing a pelletized material, comprising the step of adding a UV additive as claimed in claim 1 to an aminoplastic melt during the synthesis of the aminoplastic molding composition.

* * * * *